United States Patent
Cragun et al.

(10) Patent No.: US 7,283,970 B2
(45) Date of Patent: Oct. 16, 2007

(54) METHOD AND MEETING SCHEDULER FOR AUTOMATED MEETING INSERTION AND RESCHEDULING FOR BUSY CALENDARS

(75) Inventors: Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 10/068,497

(22) Filed: Feb. 6, 2002

(65) Prior Publication Data

US 2003/0149606 A1    Aug. 7, 2003

(51) Int. Cl.
*G06Q 10/00*    (2006.01)
(52) U.S. Cl. .................. 705/8; 705/7; 705/9
(58) Field of Classification Search ........... 705/7–9
See application file for complete search history.

(56) References Cited

U.S. PATENT DOCUMENTS

| | | | | |
|---|---|---|---|---|
| 5,050,077 | A * | 9/1991 | Vincent | 705/8 |
| 5,093,901 | A | 3/1992 | Cree et al. | |
| 5,124,912 | A * | 6/1992 | Hotaling et al. | 705/9 |
| 5,774,867 | A * | 6/1998 | Fitzpatrick et al. | 705/8 |
| 5,890,134 | A | 3/1999 | Fox | |
| 5,963,913 | A | 10/1999 | Henneuse et al. | |
| 6,047,260 | A * | 4/2000 | Levinson | 705/9 |
| 6,101,480 | A * | 8/2000 | Conmy et al. | 705/9 |
| 6,216,109 | B1 * | 4/2001 | Zweben et al. | 705/8 |
| 6,278,978 | B1 * | 8/2001 | Andre et al. | 705/9 |
| 6,606,529 | B1 * | 8/2003 | Crowder et al. | 700/100 |
| 7,027,996 | B2 * | 4/2006 | Levinson | 705/8 |
| 2002/0194246 | A1 * | 12/2002 | Moskowitz et al. | 709/102 |
| 2003/0065544 | A1 * | 4/2003 | Elzinga et al. | 705/8 |

FOREIGN PATENT DOCUMENTS

JP    06028361 A  *  2/1994

OTHER PUBLICATIONS

"Experience with a learning personal assistant" by Mitchell et al, School of Computer Science, Carnegie Mellon University, white paper, Communications of the ACM, Jul. 1994.*

(Continued)

*Primary Examiner*—C. Michelle Tarae
*Assistant Examiner*—Jonathan G Sterrett
(74) *Attorney, Agent, or Firm*—Joan Pennington

(57) ABSTRACT

A method and meeting scheduler are provided for automated meeting insertion and rescheduling for busy calendars. An electronic calendar meeting scheduling program stores meeting automation properties defined for each scheduled meeting. The electronic calendar meeting scheduling program stores meeting attendee automation properties defined for each attendee of each scheduled meeting. The electronic calendar meeting scheduling program utilizes the stored meeting automation properties and the stored meeting attendee automation properties to calculate a conflict score and action list for each potential time block for automated meeting insertion and rescheduling. The calculated conflict score and action list for each potential time block for rescheduling a meeting are based upon multiple factors including a move score, a leave early score, and a shorten meeting score. The action list includes an entry for each meeting altered for automated meeting insertion and rescheduling.

16 Claims, 14 Drawing Sheets

OTHER PUBLICATIONS

"Toward Intelligent Meeting Agents" by Chen et al, IEEE, 1996.*

"Supply Chain planning optimization: Just the facts" by Larry Lapide, www.e-optimization.com, 1998.*

Lin, C K Y; "Microcomputer-based workforce scheduling for hosptial porters", 1999, Journal of Management in Medicine v13n4 pp: 251, Dialog 02405180 116360139.*

Khamooshi, Homayoun, "Network-based project planning and scheduling", 1996, Industrial Management + Data Systems v96n8 pp: 13, Dialog 2398030 117542172.*

Alberto De Toni; Guido Nassimbeni; Stefano Tonchia; "An artificial, inteligence-based production scheduler", 1996, Integrated Manufacturing Systems v7n3 pp: 17-25, Dialog 02325278 86067498.*

Abdallah, Mohamed H, "A knowledge-based simulatin model for job shop scheduling", 1995, International Journal of Operations & Production Management v15n10 pp: 89-102, Dialog 1135741 97-85135.*

Houghton, Erne: Portougal, Victo, "A planning model for just-in-time batch manufacturing", 1995, International Journal of Operations & Production Management v15n9 pp: 9-25, Dialog 01129497 97-78891.*

Duffie, Neil A; Prabhu, Vittaldas V, "Real-time distributed scheduling of heterarchical manufacturing systems", 1994, Journal of Manufacturing Systems v13n2 pp: 94-107, Dialog 00850902 95-00294.*

Ho, Chrwan-jyh; Narasimhan, Ram; Melynk, Steve A.; Carter, Phillip L; "Research Framework for Investigating the Effectiveness of Dampening Procedures to Cope with MRP System Nervousness", 1992, International Journal of Operations & Production Management v12n6 pp: 30-43, Dialog 0633244 92-48184.*

Cai, X.; Goh, C.J.; Mees, Alistair I.; "Greedy heuristics for rapid scheduling of trains on a single track.", May 1998, IIE Transactions, v30 , n5 , p481(13), Dialog 10301494 Supplier No: 20869897.*

Feo, Thomas A.; Bard, Jonathan F.; Holland, Scott D ;A"GRASP for scheduling printed wiring board assembly. (greedy randomized adaptive search procedure)", Feb. 1996, IIE Transactions , v28 , n2 , p155(11), Dialog 08777180 Supplier No. 18331623.*

Raman, Narayan, "Input control in job shops.", Apr. 1995, IIE Transactions, v27 , n2 , p201(9), Dialog 08037879 Supplier No. 17099739.*

Maes, Pattie, "Agents that reduce work and information overload", Jul. 1994, Communications of the ACM v37n7 pp. 30-40, Dialog 00877416 95-26808.*

Burke, Edmund; Bykov, Yuri; Newall, James; Petrovic, Sanja; "A time-predefined local search approach to exam timetabling problems."*

* cited by examiner

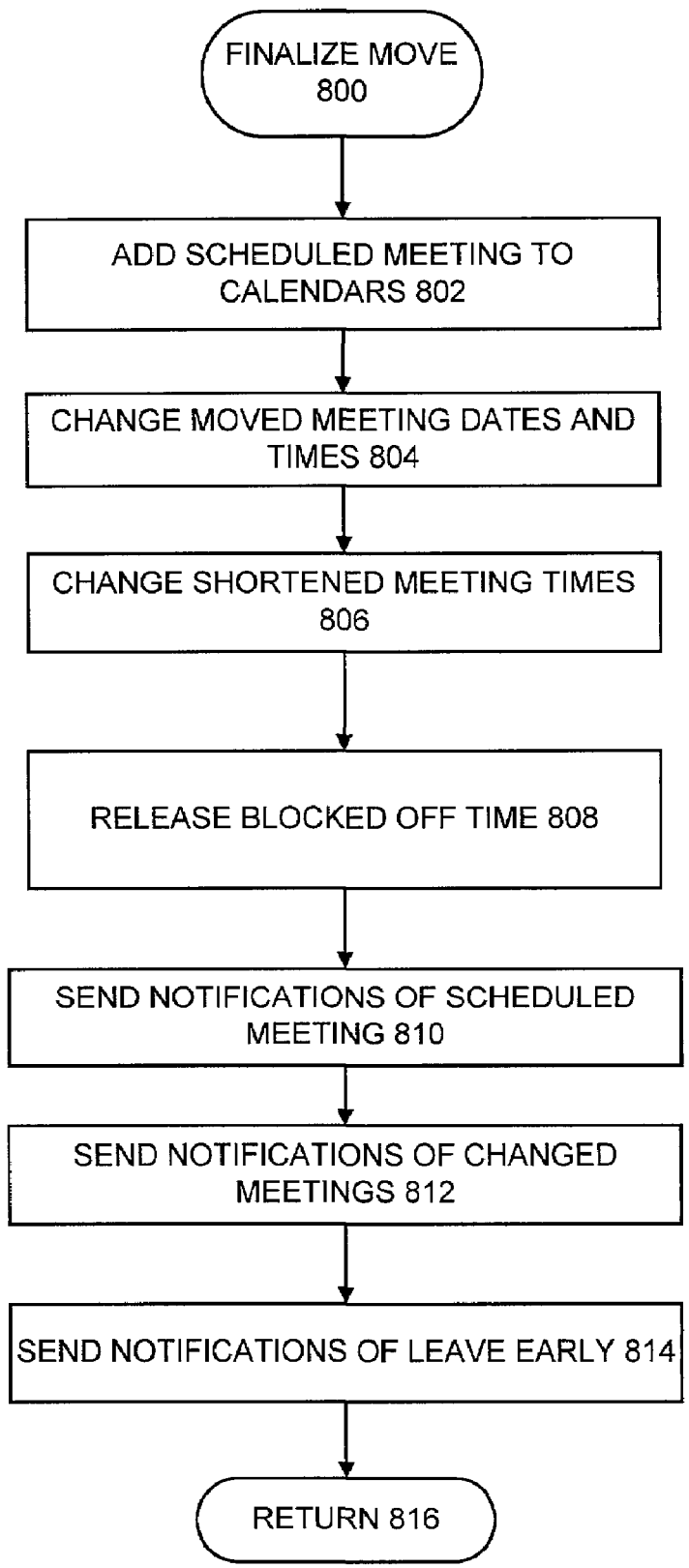

FIG. 10

MEETING AUTOMATION PROPERTIES 1000

MOVE PREMIUM [10]

COMPLETION DEADLINE [DECEMBER 31, 2001]

- ⦿ MEETING OWNER'S APPROVAL REQUIRED TO MOVE MEETING
- ○ ALL REQUIRED ATTENDEES' APPROVAL REQUIRED TO MOVE MEETING
- ○ REQUIRED APPROVALS TO MOVE MEETING

SUSAN MANAGER
  JOHN R. OWNER
  JEFF S. GURU

[ADD] [DELETE]

- ○ SHORTEN MEETING WITHOUT APPROVAL BY [10] PERCENT
- ⦿ MEETING OWNER'S APPROVAL REQUIRED TO SHORTEN MEETING
- ○ ALL REQUIRED ATTENDEES' APPROVAL REQUIRED TO SHORTEN
- ○ REQUIRED APPROVALS TO SHORTEN MEETING

SUSAN MANAGER

[ADD] [DELETE]

SHORTEN PREMIUM [10] FOR UP TO [5] PERCENT OF TIME

SHORTEN PREMIUM [20] FOR UP TO [15] PERCENT OF TIME

SHORTEN PREMIUM [50] FOR UP TO [50] PERCENT OF TIME

LEAVE PREMIUM [20]

- ☑ ATTENDEES MAY LEAVE UP TO [10] MINUTES EARLY, IF NEEDED
- ☑ NOTIFY MEETING OWNER VIA E-MAIL
- ☐ ATTENDEES MUST RECEIVE MEETING OWNERS APPROVAL IF LEAVING EARLY

FIG. 11

MEETING ATTENDEE AUTOMATION PROPERTIES 1100

ROLE IN MEETING:

| OWNER | v |
|---|---|
| PRESENTER | |
| OBSERVER | |
| COLLABORATOR | |

COMMITMENT

- ○ WILL NOT ATTEND
- ○ ATTEND IF AVAILABLE - DO NOT HOLD TIME
- ○ ATTEND IF AVAILABLE - HOLD TIME
- ◉ WILL ATTEND

AUTOMATED MOVE APPROVAL

- ○ APPROVAL NOT NEEDED
- ◉ APPROVAL GRANTED IF [48] HOURS NOTICE PROVIDED
- ○ EXPLICIT APPROVAL IS REQUIRED
- ☑ SEND MESSAGE TO MY PAGER IF LESS THAN [8] HOURS FROM CHANGE

AUTOMATED LEAVE APPROVAL

- ○ APPROVAL NOT NEEDED
- ○ APPROVAL GRANTED FOR UP TO [5] MINUTES
- ◉ APPROVAL GRANTED FOR LESS THAN "WILL ATTEND" COMMITMENT UP TO [10] MINUTES
- ○ EXPLICIT APPROVAL IS REQUIRED

AUTOMATED SHORTEN APPROVAL

- ◉ APPROVAL NOT NEEDED
- ○ APPROVAL GRANTED FOR UP TO [10] PERCENT OF MEETING TIME
- ○ EXPLICIT APPROVAL IS REQUIRED

METHOD AND MEETING SCHEDULER FOR AUTOMATED MEETING INSERTION AND RESCHEDULING FOR BUSY CALENDARS

FIELD OF THE INVENTION

The present invention relates generally to the data processing field, and more particularly, relates to a method, meeting scheduler and computer program product for automated meeting insertion and rescheduling for busy calendars.

DESCRIPTION OF THE RELATED ART

Current art in calendar systems provides tools to find time for a meeting. Simple processing looks at available time and resources, finds the open space that most closely matches the time, then schedules the time and notifies the attendees.

U.S. Pat. No. 5,050,077 discloses a method of scheduling a meeting among terminal users who are provided with calendaring applications for storing and retrieving times and dated events. A prompting screen is presented to a meeting scheduler with blanks for keying in desired times, dates, and prospective attendees for a meeting. In response to the scheduler keying to this screen, a comparison is made with the calendar of events for each prospective attendee. As a result of the nonavailability of a meeting time which complies with the desired times, dates, and attendees, certain of these factors are automatically altered or relaxed in order to achieve an acceptable meeting time. An option list of meeting times is then presented to the scheduler for selection of a meeting time. Based upon the selection of the scheduler, a meeting notification screen is then constructed for transmittal to each attendee.

U.S. Pat. No. 5,093,901 discloses a method of exchanging entries on calendars being maintained by a first and a second calendar user. An event is automatically scheduled on a second calendar if a classification which is associated with the event is higher than any previous scheduled event for the same time slot. A reply is prepared and transmitted to the first calendar user which requested the scheduling of the event regarding the status of the second user in regards to the scheduled event. Subsequently, if the status of the second user changes in regards to the event, a subsequent reply is prepared and transmitted to the first user setting forth the changed status.

U.S. Pat. No. 5,774,867 discloses a method and apparatus for camping on an electronic calendar that in one embodiment determines, in response to an input, of a date, a time and a duration of a proposed meeting between meeting requester and a target, that a conflicting event appears on the target's electronic calendar, monitors the target's electronic calendar to detect the removal of the conflicting event, and schedules a meeting between the requester and the target on their electronic calendars in response to the detection of the removal of the conflicting event.

U.S. Pat. No. 5,890,134 discloses a schedule optimizing algorithm scheduling quality, reducing a schedule cycle time and requiring only marginal increase in computer execution time. Lower quality computerized scheduling programs are substantially improved through the additional steps of sequential left time shifting and right time shifting of respective chronologically sorted completion time and starting time task listings.

U.S. Pat. No. 5,963,913 discloses a system and method for scheduling an event subject to the availability of requested participants. A server application receives event information submitted by a scheduler using a client application to access an event definition page. The event information provides one or more options for scheduling an event and lists a plurality of requested participants. Responsive to receiving the event information, the server application creates an event reply page and an event confirmation page. The server application then creates and sends an electronic mail message to each requested participant to provide information about the one or more options and a link to the event reply page. The server application also creates and sends a message to the scheduler to provide a link to the event confirmation page. The server application then receives reply information submitted by the requested participants using client applications to access the event reply page. The server application processes this reply information together with the original event information to generate one or more potential schedules and then updates the event confirmation page based upon the potential schedules. The server application receives an event confirmation submitted by the scheduler using a client application to access the event confirmation page and then creates and sends a message to each available participant to provide the schedule for the event.

U.S. Pat. No. 6,101,480 discloses a system for scheduling time intervals for a plurality of users on a network comprised database system that stores a profile for each potential invitee of the system at one or more servers. The invitee profiles comprises user profiles wherein each user profile has information regarding available and unavailable times for that user. The system further comprises request generators located remotely from the server and connected over a network that generates a request for allocation of a time interval for one or more of the plurality of invitees. A busy time determination device gathers the profiles for the one or more requested invitees that are available in the database and determining whether those invitees are available during the time interval requested by the request generating means. If not all invitees are available, a best fit determinating system determines a next best time interval.

Currently available meeting scheduling systems have provided improvements over earlier calendaring arrangements; however, these systems have limited capability or deficiencies in many scheduling and rescheduling situations, particularly for busy calendars. Known calendar scheduling is not adequate when a meeting must happen sooner than a first open time slot, or when calendars of multiple users generally are full. For example, the calendar system shows the first open time for all parties is three weeks out, but people need to meet sometime this week. Usually a meeting time can be found if other meetings can be moved around or if block-out times are relaxed. In the past, this re-negotiation of times has required human intervention.

SUMMARY OF THE INVENTION

A principal object of the present invention is to provide a method, meeting scheduler and computer program product for automated meeting insertion and rescheduling for busy calendars. Other important objects of the present invention are to provide such method, meeting scheduler and computer program product for automated meeting insertion and rescheduling for busy calendars substantially without negative effect and that overcome many of the disadvantages of prior art arrangements.

In brief, a method, meeting scheduler and computer program product are provided for automated meeting insertion and rescheduling for busy calendars. An electronic calendar meeting scheduler stores meeting automation properties defined for each scheduled meeting. The electronic calendar meeting scheduling program identifies a solution time block for automated meeting insertion and rescheduling utilizing stored meeting automation properties.

In accordance with features of the invention, the electronic calendar meeting scheduling program utilizes stored meeting automation properties to change each conflicting scheduled meeting for the identified solution time block for the automated meeting insertion and rescheduling.

In accordance with features of the invention, the electronic calendar meeting scheduling program stores meeting attendee automation properties defined for each attendee of each scheduled meeting. The electronic calendar meeting scheduling program utilizes the stored meeting automation properties to calculate a conflict score and action list for each potential time block for automated meeting insertion and rescheduling. The stored meeting attendee automation properties also can be used with the stored meeting automation properties to calculate the conflict score and action list for each potential time block for automated meeting insertion and rescheduling. The action list includes an entry for each conflicting meeting for automated meeting insertion and rescheduling. The electronic calendar meeting scheduling program utilizes the calculated conflict score and action list of the potential time blocks to identify a solution time block for automated meeting insertion and rescheduling.

In accordance with features of the invention, the meeting automation properties defined for each scheduled meeting include a move premium value for moving the meeting, a shorten premium value for shortening the meeting and a leave premium value for allowing attendees to leave the meeting early. Both the meeting automation properties and the meeting attendee automation properties include multiple approval options for moving the meeting, for shortening the meeting and for allowing attendees to leave the meeting early. The meeting attendee automation properties include an attendee role for each attendee of each the scheduled meeting, such as owner, presenter, observer and collaborator. The meeting attendee automation properties include attendee commitment option for attending, and attendee selected notification options. The calculated conflict score and action list for each potential time block for rescheduling a meeting are based upon multiple factors including a move score, a leave early score, and a shorten meeting score.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, 3, 4, 5, 6, 7, 8, 9A and 9B are flow charts illustrating exemplary steps for automated meeting insertion and rescheduling for implementing methods for busy calendars in accordance with the preferred embodiment;

FIGS. 10 and 11 are diagrams illustrating exemplary menu user entry screens for receiving user selected meeting automation properties and meeting attendee automation properties for implementing methods for busy calendars in accordance with the preferred embodiment.

DETAILED DESCRIPTION OF THE PREFERRED EMBODIMENTS

Figure 1A:
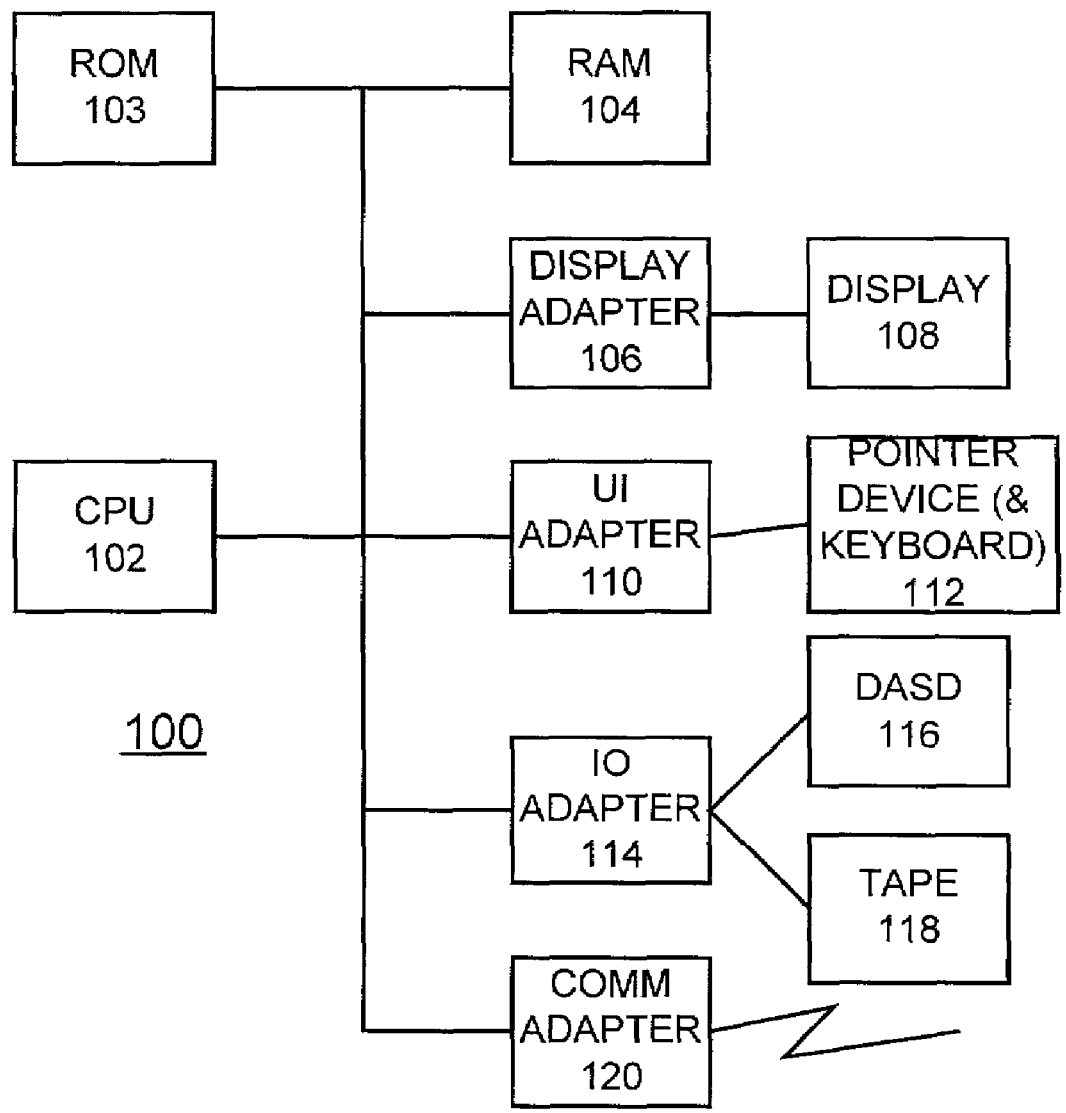
FIGS. 1A and 1B are block diagram representations illustrating a computer system for implementing methods for automated meeting insertion and rescheduling for busy calendars in accordance with the preferred embodiment.
Figure 1B:
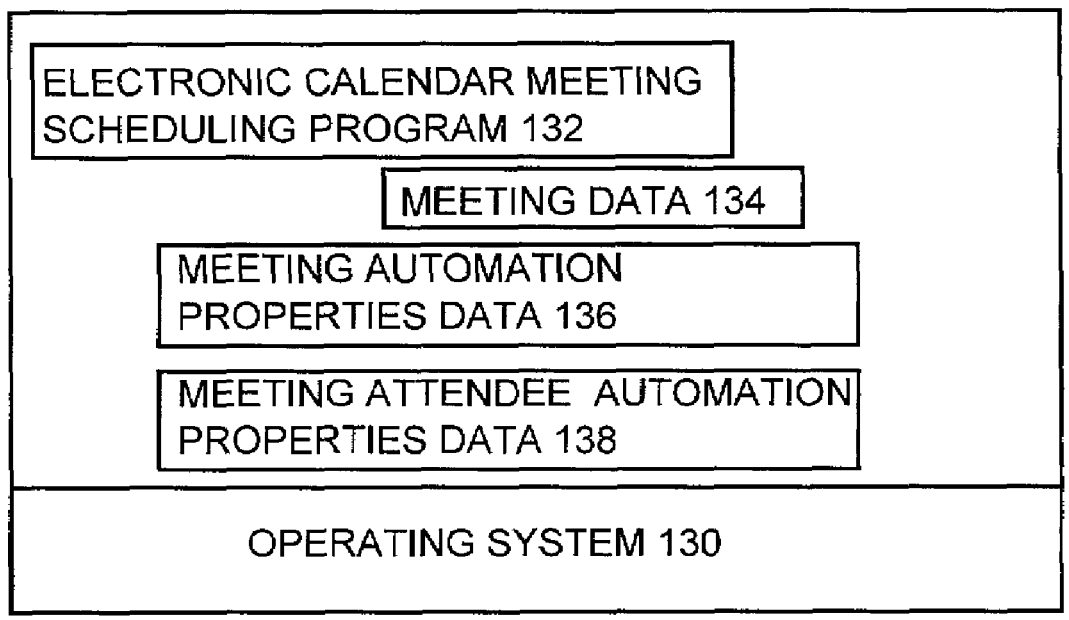

Having reference now to the drawings, in FIGS. 1A and 1B, there is shown a computer or data processing system generally designated by the reference character 100 for carrying out the meeting insertion and rescheduling methods of the preferred embodiment. As shown in FIG. 1A, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

FIG. 1B illustrates an operating system 130 together with an electronic calendar meeting scheduling program 132 of the preferred embodiment. In accordance with features of the preferred embodiment, stored meeting data 134 include meeting automation properties data 136 and meeting attendee automation properties data 138 of the preferred embodiment. Exemplary meeting automation properties data 136 and meeting attendee automation properties data 138 are illustrated in FIGS. 10 and 11.

In accordance with features of the preferred embodiment, additional capability over known calendaring systems is provided to automatically reschedule and renegotiate meetings, for example, when a new meeting absolutely must be fit into different busy schedules. Existing meetings are given a movability rating that defines how difficult is it to move a particular meeting. Several factors are involved, including how many people are involved in the move, availability and location of resources for the meeting, how soon the meeting must occur, and the importance of certain attendees, such as, executives or the person who called the meeting or the meeting's owner. A target time for the new or rescheduled meeting is found based on a least cost of moving other existing meetings. A temporary placeholder is provided or put in place to reserve space for a new meeting. The other meetings already in the target time are moved and notifications are sent to the attendees. Alternatively, meeting settings may require attendee approval before the other meetings are moved. If so, approvals are gathered. The new meeting is placed and confirmations are sent. An option allows notification by e-mail, phone or pager; for example, if change occurs on same day.

In accordance with features of the preferred embodiment, for each meeting, a person's or an attendee's commitment to attending the meeting is kept. Multiple options of definitely will attend, likely to attend, and will not attend are kept. A flag is set for anyone whose absence would cause the meeting to require rescheduling. This aspect of the attendee's commitment to attending the meeting is used in conjunction with automated rescheduling of the preferred embodiment. Multiple meeting attendee automation properties are defined and stored, for example, as illustrated and described with respect to FIG. 11.

In accordance with features of the preferred embodiment, meetings are also flagged with information describing what kinds of changes to them are allowed and under what conditions. Multiple meeting automation properties are defined and stored, for example, as illustrated and described with respect to FIG. 10. Meetings may be marked with respect to allowance to be moved, be shortened, or that attendees may leave early if required. Any required approvals or notifications are specified as well as setting to allow automated approval under certain conditions. Scoring values are provided to encourage one kind of solution over another, for example, if rescheduling is preferred over shortening the meeting. As a result of features of the invention, the capability to reschedule any meeting is enhanced.

Utilizing meeting automation properties, additional calendar functions are made possible. For example, automatic adjustment is enabled when someone calls in sick, or for some reason cannot come to the meeting. If the person is absolutely critical for the meeting, what often happens with conventional arrangements is that people show up for the meeting and wait 15 minutes and then go back to their offices. If the sick person remembers to call the secretary and to ask the secretary to reschedule the meeting, the notices can be manually sent. But, normally the person simply calls in sick and nothing else happens for meeting re-scheduling.

Figure 9A:
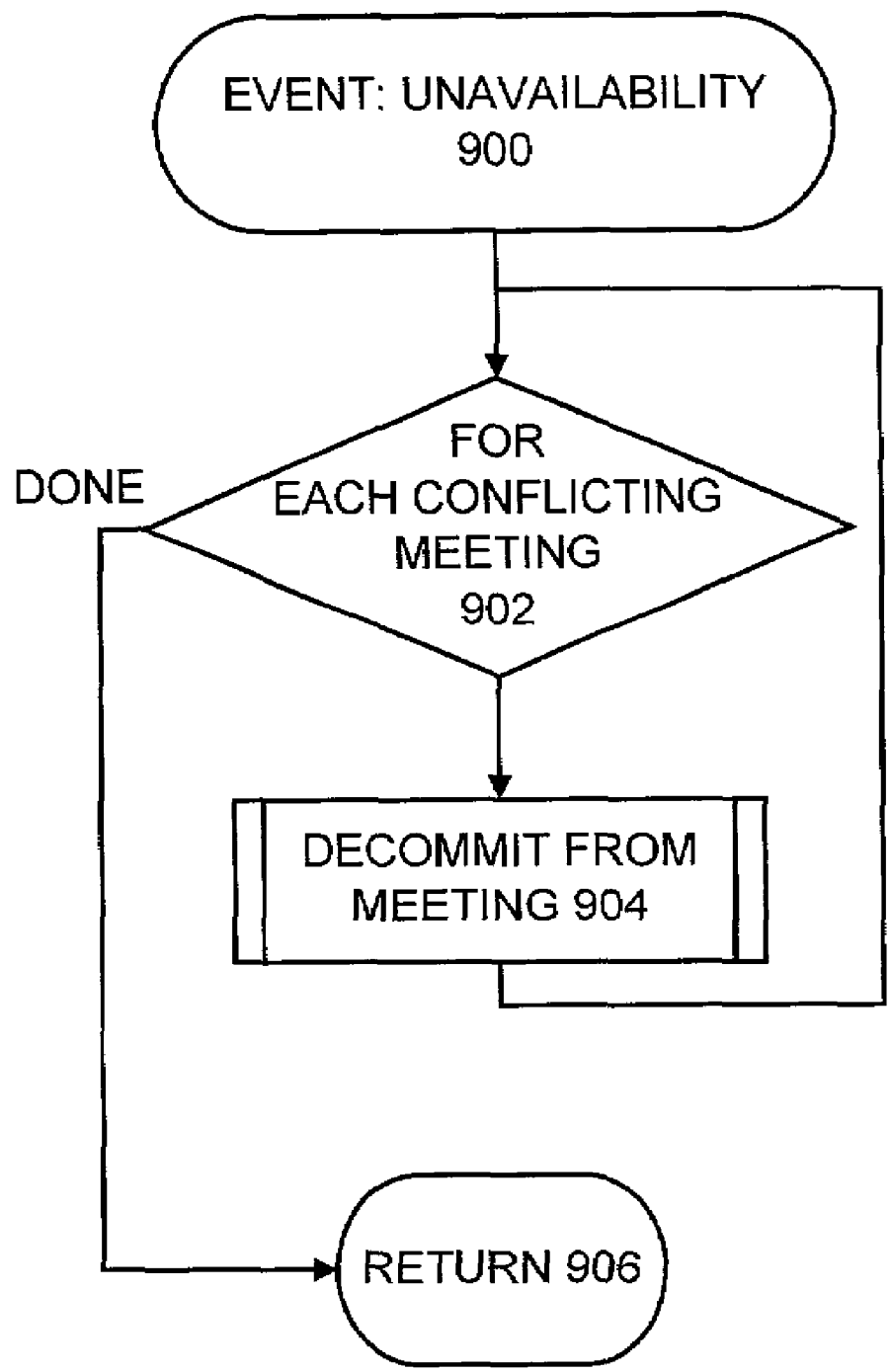
Figure 9B:
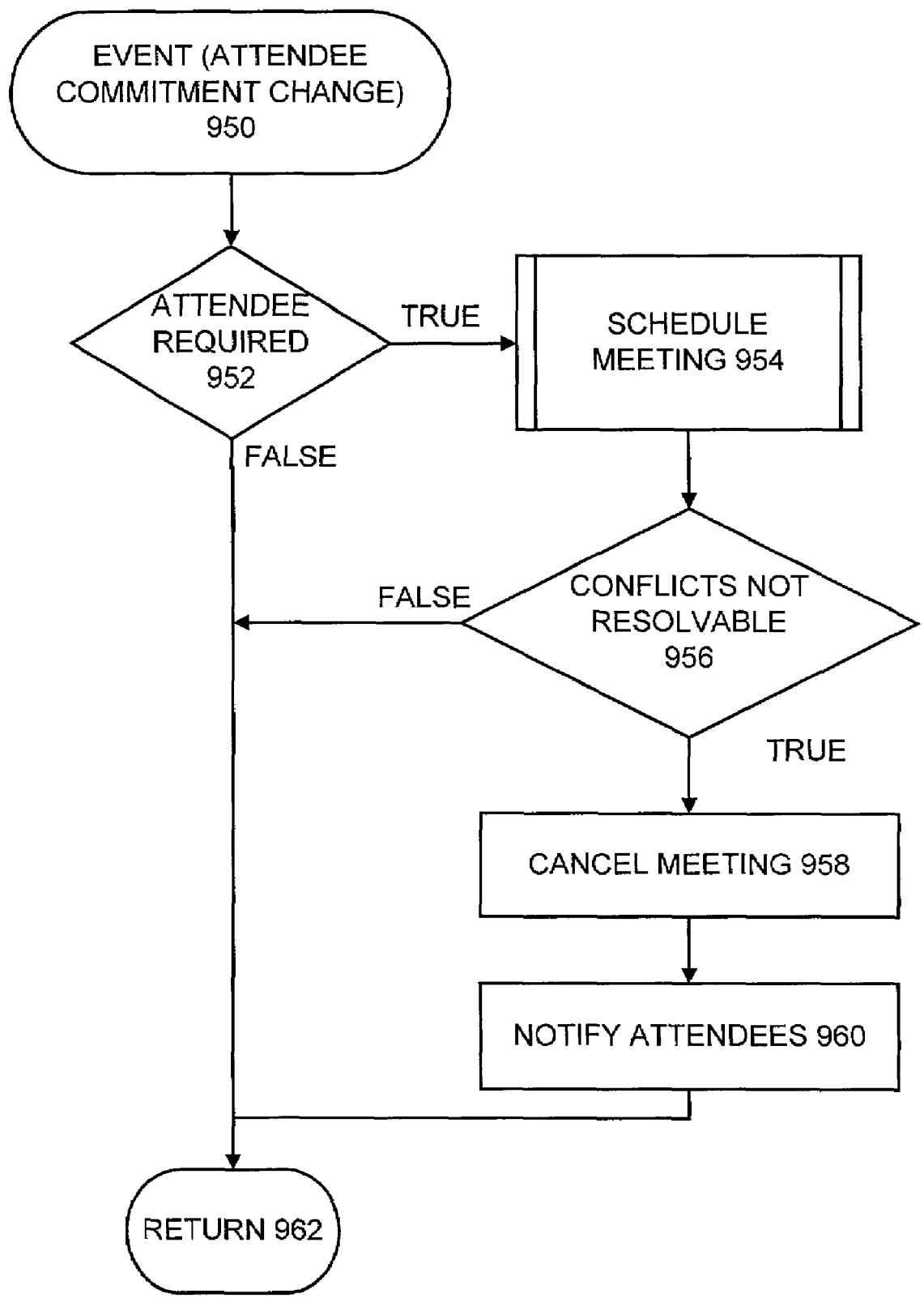

In accordance with features of the preferred embodiment, electronic calendar meeting scheduling program 132 provides an automatic cancellation and reschedule function. With this new function, if a person is sick, he calls his boss or secretary and they simply put an entry on his calendar indicating sick or not available for a given time period. The electronic calendar meeting scheduling program 132 then automatically determines which meetings are affected and then proceeds to reschedule if possible, inserting a meeting where it would not normally fit, or to cancel if a new meeting cannot be scheduled, for example, as shown in FIGS. 9A and 9B.

Figure 2:
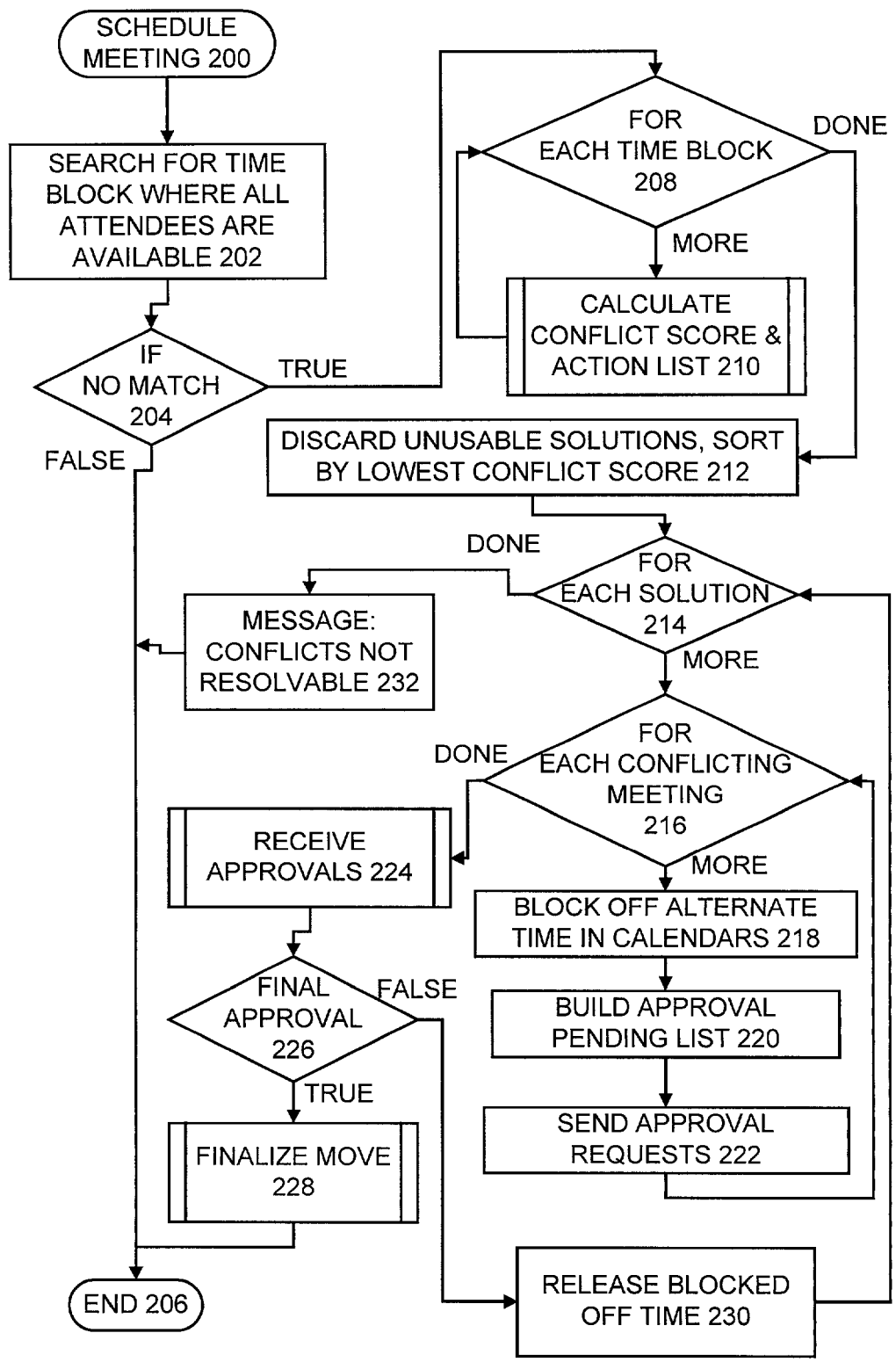

Referring now to FIG. 2, there are shown exemplary steps for automated meeting insertion and rescheduling for implementing methods for busy calendars in accordance with the preferred embodiment. Meeting scheduling starts as indicated in a block 200. First searching for a time block where all attendees are available is performed as indicated in a block 202. This takes into account the meeting deadline and if this is a move or shortening of an existing meeting, views the existing time as open during the search. Checking for no match found is performed as indicated in a decision block 204. If false or a match is found, then the sequential steps end as indicated in a block 206. If true that no match is found, then for each time block as indicated in a decision block 208, a routine for calculating a conflict score and an action list is performed as indicated in a block 210. The conflict score is based upon multiple factors including a move score, a leave early score, and a shorten meeting score. If this is a move or shortening of an existing meeting the scoring considers the currently scheduled time as open, so a meeting does not conflict with itself. The action list includes an entry for each conflicting meeting or each meeting altered for rescheduling the meeting. The unusable solutions are discarded and the calculated conflict score results are sorted by lowest conflict as indicated in a block 212. Then for each solution as indicated in a decision block 214, for each conflicting meeting as indicated in a decision block 216 the proposed alternate time is blocked off in individual calendars as indicated in a block 218. An approval pending list is built as indicated in a block 220. The list may be empty where attendees do not require approval. Approval requests are sent as indicated in a block 222, for each conflicting meeting. After processing each conflicting meeting, a receive approvals routine is performed as indicated in a block 224. Checking for a final approval is performed as indicated in a decision block 226. When a final approval is identified, then a finalize move routine is performed as indicated in a block 228 to complete the sequential steps at block 206. Otherwise when a final approval is not identified, then the blocked off time is released as indicated in a block 230. Then the sequential steps return to block 214 and are repeated for processing a next possible solution identified at decision block 214. Otherwise when each possible solution is unsuccessfully processed, then a message is provided that the conflicts are not resolvable as indicated in a block 232. Then the sequential steps end at block 206.

Figure 3:
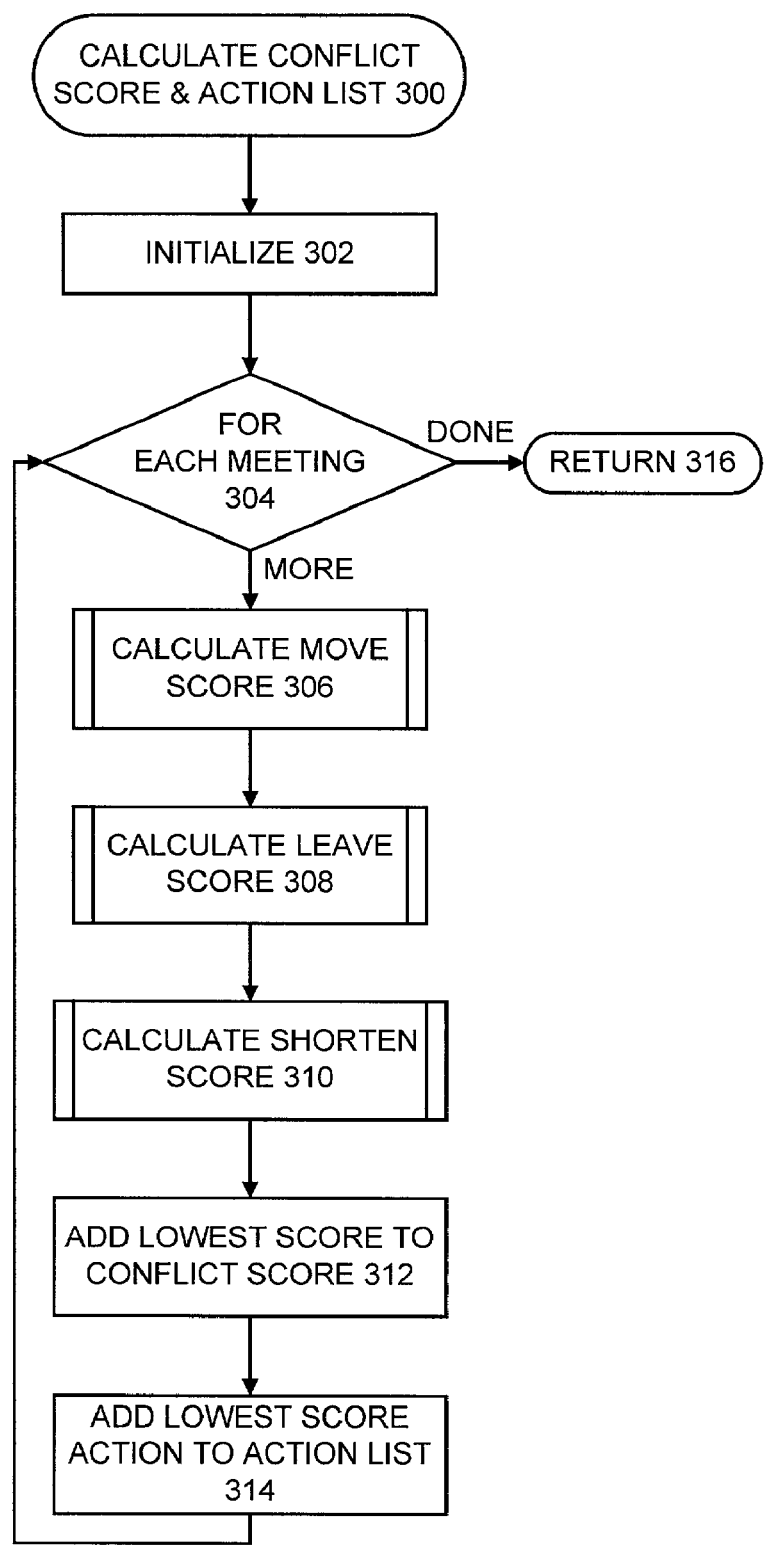

Referring now to FIG. 3, there are shown exemplary steps of the routine for calculating a conflict score and an action list at block 210 of FIG. 2 of the automated meeting insertion and rescheduling methods for busy calendars in accordance with the preferred embodiment starting at a block 300. Initialization is performed as indicated in a block 302. For each meeting as indicated in a decision block 304, a calculate move score routine is performed as indicated in a block 306. Each meeting refers to each different or separate meeting; while more than one attendee may have a conflict in the same meeting. Next a calculate leave early routine is performed as indicated in a block 308. A calculate shorten meeting score routine is performed as indicated in a block 310. Then a lowest score of the calculated move score, leave early, and shorten meeting score is added to the conflict score as indicated in a block 312. It should be understood that a low conflict score is better with the lower a particular meeting's conflict score the more likely the meeting will be moved. Conversely, a high conflict score reduces the chance a solution will be selected. A lowest score action of move, leave early, or shorten meeting is added to the action list as indicated in a block 314. After each meeting is identified at decision block 304, then the sequential operations return as indicated in a block 316.

Figure 4:
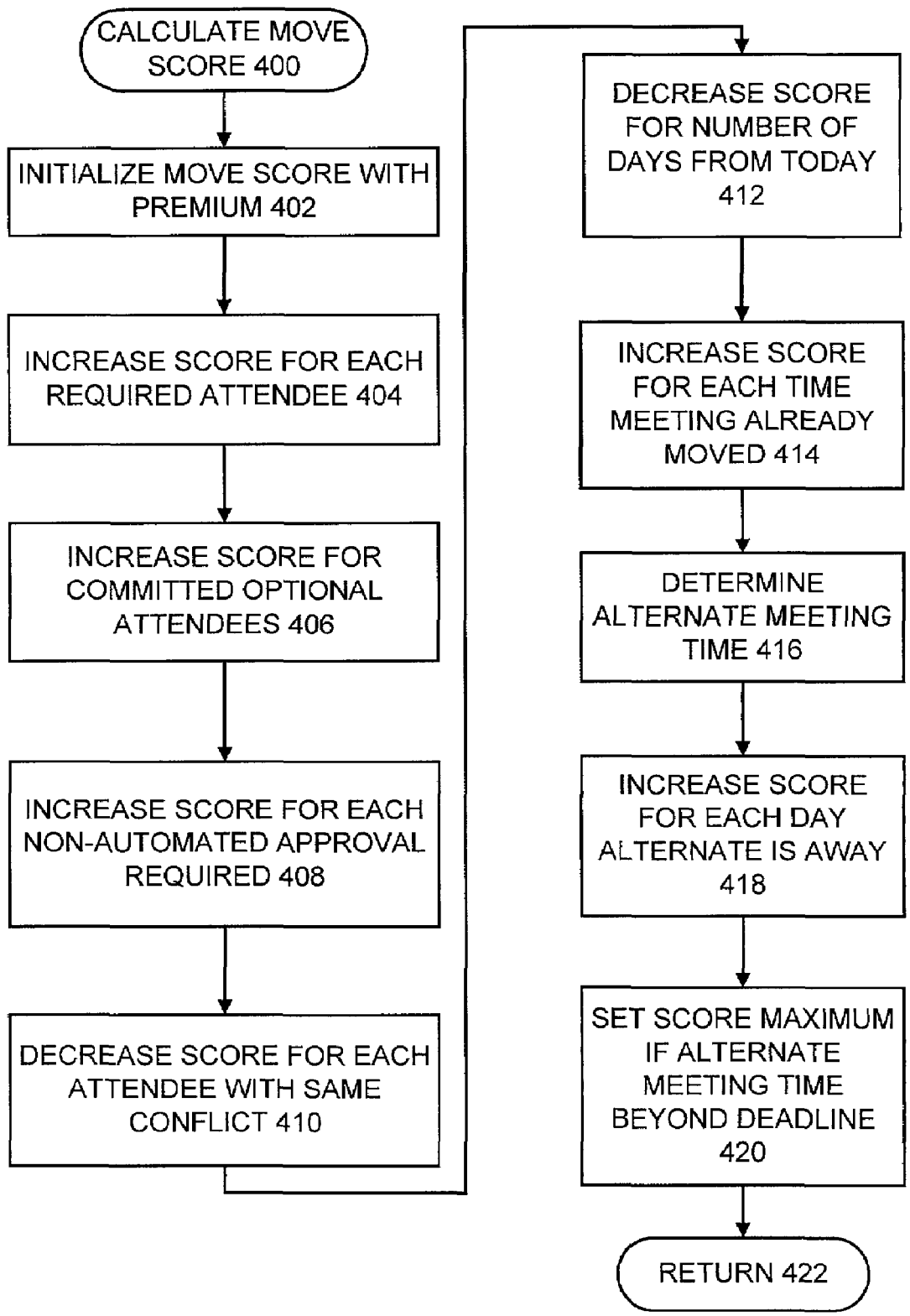

Referring now to FIG. 4, there are shown exemplary steps of a routine for calculating a move score at block 306 of FIG. 3 of the automated meeting insertion and rescheduling methods for busy calendars in accordance with the preferred embodiment starting at a block 400. Initialization of the move score with a move premium value is performed as indicated in a block 402. The move premium value is a selected meeting automation property value stored for each meeting. The move premium value has a standard default value, such as 10, in the preferred embodiment, but may be altered by the meeting owner as illustrated in FIG. 10 to be higher, such as up to 100, so as to make the meeting less likely to move. Next the move score is increased by a predefined constant for each required attendee; for example, the move score is incremented by one for each required attendee, as indicated in a block 404, making the meeting less likely to move when there are more attendees. The move score is increased by a predefined constant for each committed optional attendee; for example, the move score is incremented by one for each committed optional attendee, as indicated in a block 406. Then the move score is increased by a predefined constant for each non-automated approval required; for example, the move score is incremented by one for each non-automated approval required, as indicated in a block 408. Next the move score is decreased by a predefined constant for each attendee with the same conflict; for example, the move score is decremented by one for each attendee with the same conflict, as indicated in a block 410. The move score is decreased by a predefined constant for the number of days from today; for example, the move score is decremented by one for each day away since near meetings are harder to move than far away meetings, as indicated in a block 412. Next the move score is increased by a predefined constant for each time the meeting has already been moved; for example, the move score is incremented by one for each time the meeting has already been moved, as indicated in a block 414. Next an alternate meeting time is determined as indicated in a block 416. The move score is increased by a predefined constant for the number of days from today the alternate meeting date is away; for example, the move score is incremented by one for each day away, as indicated in a block 418. The move score is set to a maximum value if the alternate meeting time is beyond a deadline for the meeting as indicated in a block 420. By setting the move score to the maximum value, this proposed alternate meeting time becomes unusable. Then the sequential operations return as indicated in a block 422.

Figure 5:
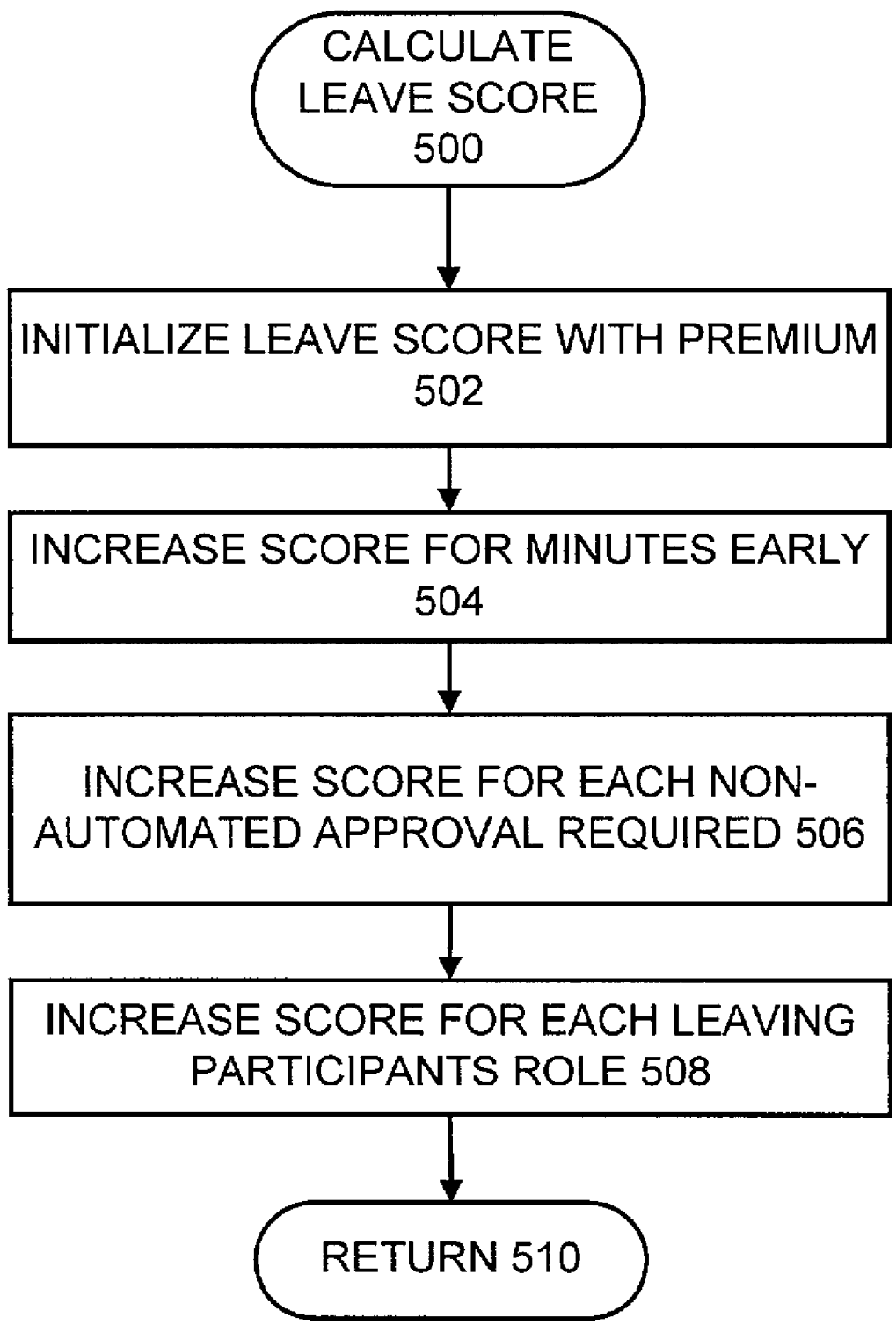

Referring now to FIG. 5, there are shown exemplary steps of a routine for calculating a leave early score at block 308 of FIG. 3 of the automated meeting insertion and rescheduling methods for busy calendars in accordance with the preferred embodiment starting at a block 500. Initialization of the leave early score with a premium is performed as indicated in a block 502. The leave early premium is a default value which causes an initial and immediate cost to a proposed solution which uses leaving early, this value may be increased by the meeting owner as illustrated in FIG. 10, such as up to 100, to decrease the likelihood that leave early will be used. Next the leave early score is increased for the minutes to leave early as indicated in a block 504; for example, the leave early score is increased by a function of the minutes early, such as 1 for each minute, 10 for each 5 minutes. Then the leave early score is increased by a predefined constant for each non-automated approval required; for example, the leave early score is incremented by one for each non-automated approval required, as indicated in a block 506. Then the leave early score is increased by a predefined constant by each leaving participant's role; for example, the leave early score is incremented by one for each observer, three for each collaborator, twenty for the owner, and a maximum value for the presenter, as indicated in a block 508. When a vital person leaves, the meeting must be shortened and leave early not selected. Then the sequential operations return as indicated in a block 510. It should be noted that while the preferred embodiment implements only a leave early solution, an arrive late solution and scoring could be added within the spirit and scope of the present invention.

Figure 6:
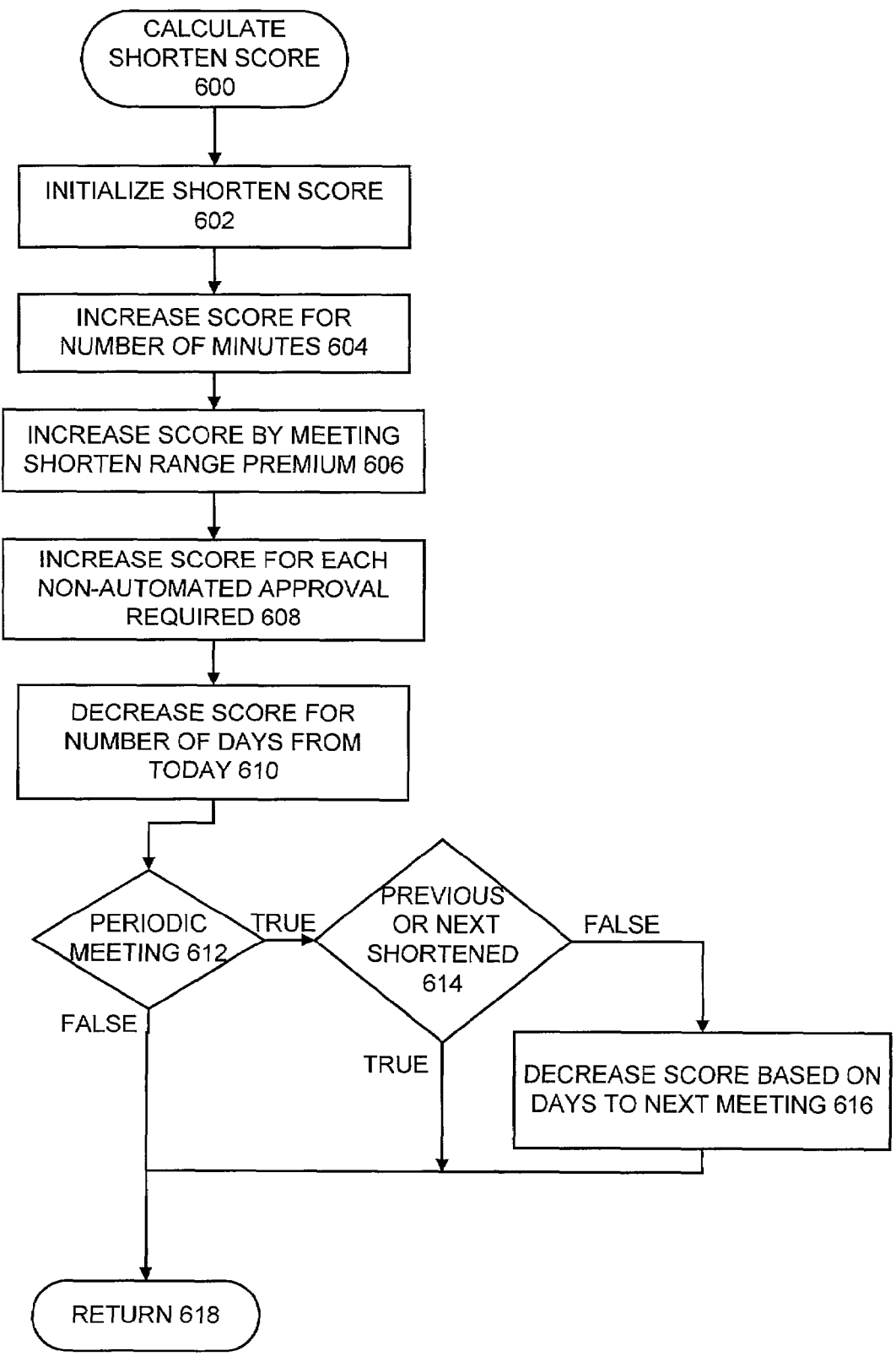

Referring now to FIG. 6, there are shown exemplary steps of a routine for calculating a shorten meeting score at block 310 of FIG. 3 of the automated meeting insertion and rescheduling methods for busy calendars in accordance with the preferred embodiment starting at a block 600. The shorten meeting score is initialized as indicated in a block 602 in the preferred embodiment to zero. Next the shorten meeting score is increased for a number of minutes needed to be shortened as indicated in a block 604. For example, the shorten meeting score is increased at block 604 by a function of the number of minutes, such as the number of minutes squared. The shorten meeting score is increased for a meeting shorten range premium as indicated in a block 606. The shorten meeting range premiums as illustrated in FIG. 10 are over and above the function of minutes and allow the meeting owner to increase the score specifically for a meeting to decrease the chance the meeting will be shortened, while allowing the meeting to be shortened under extreme circumstance. The shorten meeting score is increased for each non-automated approval required as indicated in a block 608. For example, the shorten meeting score is increased at block 608 by a one for each non-automated approval required. The shorten meeting score is decreased for the number of days from today as indicated in a block 610. For example, the shorten meeting score is decreased at block 610 by a one for each of the number of days from today. Checking whether the meeting is a periodic meeting is performed as indicated in a decision block 612. When true that the meeting is a periodic meeting, then checking whether the previous or next meeting has been shortened is performed as indicated in a decision block 614. When false that the previous or next meeting has been shortened then the shorten meeting score is decreased based on days to the next meeting as indicated in a block 616, for example, the score will decrease more if the next meeting is sooner. The rationale is that if another periodic meeting was not shortened, then once in while it is more acceptable to allow shortening on one of the series of periodic meetings. When true that the previous or next meeting has been shortened, the sequential steps return as indicated in a block 618.

Figure 7:
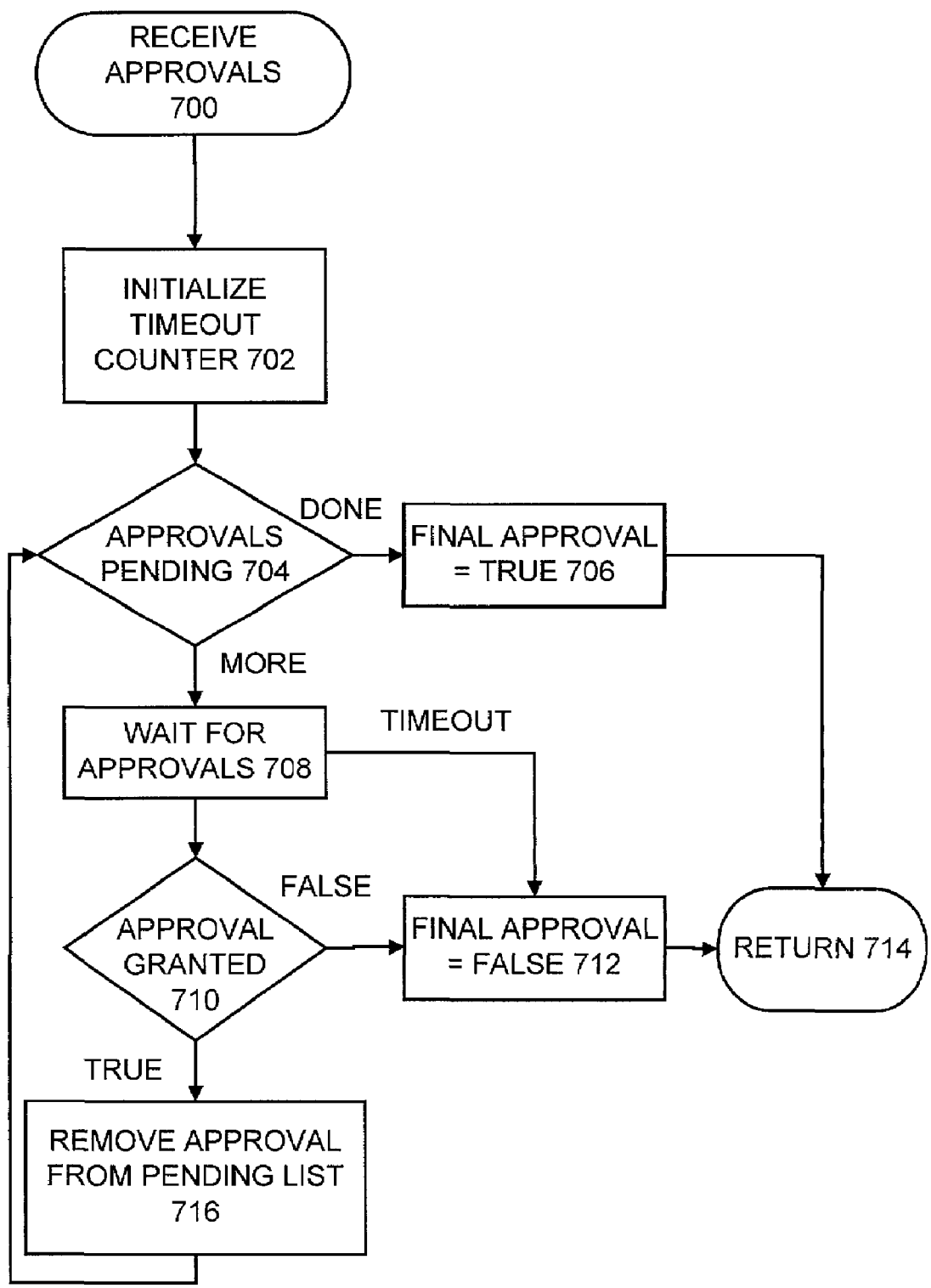

Referring now to FIG. 7, there are shown exemplary steps of the receive approvals routine at block 224 of FIG. 2 of the automated meeting insertion and rescheduling methods for busy calendars in accordance with the preferred embodiment starting at a block 700. A timeout counter is initialized as indicated in a block 702. Checking whether approvals are pending is performed as indicated in a decision block 704. When all approvals have been received, then the final approval is set to true as indicated in a block 706. When approvals are pending, waiting for approvals is provided until the timeout occurs as indicated in a block 708. Checking for an approval granted is performed as indicated in a decision block 710. When an approval is not granted or when the timeout occurs, then the final approval is set to false as indicated in a block 712. Then or after the final approval is set to true at block 706, the sequential operations return as indicated in a block 714. When an approval is granted at decision block 710, then the approval is removed from the pending list as indicated in a block 716. Then the sequential operations continue returning to decision block 704 to check whether approvals are pending. While the preferred embodiment shows one proposed solution being approved at a time, it is obvious that requesting approval for multiple solutions at the same time would be within the spirit and scope of the present invention.

Referring now to FIG. 8, there are shown exemplary steps of the finalize move routine at block 228 of FIG. 2 of the automated meeting insertion and rescheduling methods for busy calendars in accordance with the preferred embodiment starting at a block 800. The scheduled meeting is added to the calendars as indicated in a block 802. The moved meeting dates and times are changed as indicated in a block 804. The shortened meeting times are changed as indicated in a block 806. The blocked off time is released as indicated in a block 808. Notifications of the scheduled meeting are sent as indicated in a block 810. Notifications of the changed meeting are sent as indicated in a block 812. Notifications of leave early for the scheduled and changed meetings are sent as indicated in a block 814. Then the sequential operations return as indicated in a block 816.

Referring now to FIG. 9A, there are shown exemplary steps for processing an event of an unavailability of an attendee of the automated meeting insertion and rescheduling methods for busy calendars in accordance with the preferred embodiment starting at a block 900. For each conflicting meeting as indicated in a decision block 902, a decommit from meeting routine for the unavailable attendee is processed as indicated in a block 904, which is shown in FIG. 9B. Then the sequential operations return as indicated in a block 906.

Referring now to FIG. 9B, there are shown exemplary steps for processing an event of an attendee commitment change, such as a decommit, of the automated meeting insertion and rescheduling methods for busy calendars in accordance with the preferred embodiment starting at a block 950. Checking whether the attendee is required is performed as indicated in a decision block 952. When true that the attendee is required, the schedule meeting routine of FIG. 2 is performed as indicated in a block 954. Checking whether the conflicts are not resolvable is performed as indicated in a decision block 956. When true that the conflicts are not resolvable, then the meeting is cancelled as indicated in a block 958. Attendees are notified as indicated in a block 960. Then and when determined at decision block 952 that the conflicts are resolvable, the sequential steps return as indicated in a block 962.

FIG. 10 illustrates an exemplary menu user entry screen for receiving user selected meeting automation properties for implementing methods for busy calendars generally designated by the reference character 1000 in accordance with the preferred embodiment. The properties input and controlled by FIG. 10 are contained in one or more records associated with each meeting as is common in the art. User selected meeting automation properties 1000 include user entered values for a move premium and a completion deadline for the scheduled meeting. The move premium is a score value that is added to a meeting score that indicates foundational difficulty in moving the specific meeting. A default value is provided and the meeting owner may choose to increase or decrease the value to decrease or increase the likelihood that the meeting will be moved. That is a higher score represents a greater inconvenience to the attendees if the meeting is moved. The completion deadline represents the latest allowed date for a meeting to be scheduled. User selected meeting automation properties 1000 include multiple options for approval required to move the scheduled meeting including a meeting owner's approval, all required attendees' approval and a list of selected attendees that must approve; these choices are mutually exclusive or exclusive of each other in the preferred embodiment. User selected meeting automation properties 1000 include multiple options for approval required to shorten the scheduled meeting including no approval required to shorten the scheduled meeting by a selected percentage of the total minutes of the original time, a meeting owner's approval, all required attendees' approval and a list of selected attendees that must approve, these choices are exclusive of each other in the preferred embodiment. User selected meeting automation properties 1000 include multiple options for user entered values for a shorten premium for selected percentages of time. The shorten premiums are scores, one of which will be added to a solution proposing the shortening of a meeting, depending on the percentage of minutes the meeting is shortened from its original length. A default value is provided as well as default percentages to form three ranges of reductions. The defaults assume that medium costs are associated up to, for example, 15% reduction, and high but allowable costs are associated up to a 50% reduction, and that reduction is not acceptable beyond 50% resulting in such a high cost that moving the meeting or some other solution will be chosen instead. The meeting owner may adjust these premiums to influence the likelihood of the meeting being shortened or not. User selected meeting automation properties 1000 include multiple user entered values for a leave premium. User selected meeting automation properties 1000 include options for a number of minutes that attendees may leave early, if needed and to notify the meeting owner via e-mail if any attendees may leave early. User selected meeting automation properties 1000 include an option for the meeting owner's approval if attendees may leave early.

FIG. 11 illustrates an exemplary menu user entry screen for receiving user selected meeting attendee automation properties for implementing methods for busy calendars generally designated by the reference character 1100 in accordance with the preferred embodiment. In the preferred embodiment, FIG. 11 provides a user view of a record or set of records which are connected, one set per each user to each meeting. User selected meeting attendee automation properties 1100 include multiple options of a role in the meeting, for example, set by the meeting owner including owner, presenter, observer and collaborator. For example, the presenter is the focus point of meeting and attendance is vital for the scheduled meeting; the observer is an optional attendee; and the collaborator is a required attendee. User selected meeting attendee automation properties 1100 include multiple options for commitment to the meeting, for example, set by the attendee with acknowledgement including will not attend; will attend if available, do not hold time; will attend if available, hold time; and will attend. Hold time indicates how the attendee would like the scheduling system to treat the calendar time if other meetings are scheduled. If the time is held, the scheduler will not schedule something else in this time or will arrange to have the meeting occupying this time, even though the attendee is not committed to attend. If the time is not held, the scheduler will allow another meeting to be scheduled in this time, obviously, if the attendee is a required collaborator or a presenter, a firm "will attend" will be required by the scheduler to consider the meeting scheduled. User selected meeting attendee automation properties 1100 include multiple options for automated move approval for the meeting, for example, set by the attendee, including approval not needed; approval granted if a user selected number of hours notice to the attendee is provided; and explicit approval is required. In the preferred embodiment, these options are mutually exclusive. If the option selected is approval granted if a user selected number of hours notice to the attendee is provided, and less than this number of hours exists until the original meeting's start, or the start of the proposed new meeting time, a request for approval is sent to the attendee. User selected meeting attendee automation properties 1100 include a user selected option for notification, for example, by a pager message if less than a selected number of hours from the changed meeting. If the option to send a message to pager is selected and the number of hours until the new meeting time or the old meeting time is less than the minimum specified, the attendee is paged both with the request to allow the change, and the notification when the change is finalized. User selected meeting attendee automation properties 1100 include multiple options for automated leave approval for the meeting, for example, set by the attendee including approval not needed; approval granted for up to a selected number of minutes; approval granted for less than will attend commitment for up to a selected number of minutes; and explicit approval is required. If the option approval granted for less than "will attend" commitment for up to selected minutes is selected, the attendee indicates to the automated scheduler that more liberty may be taken with respect to leaving early. When the attendee has already stated they may not attend, in effect that since it is already known they may not attend, it makes little difference if the scheduler must assume they will leave early, and smart scheduling should not be held back on the part of this attendee. Attendees may choose to change the default values to allow less or more flexibility for leave early times depending on their known intentions of actually participating in the meeting. User selected meeting attendee automation properties 1100 include multiple options for automated shorten approval for the meeting, for example, set by the attendee including approval not needed; approval granted for up to a selected percentage of the meeting time; and explicit approval is required. Properties are kept with the meeting. Defaults for each meeting are taken from user preferences.

Figure 12:
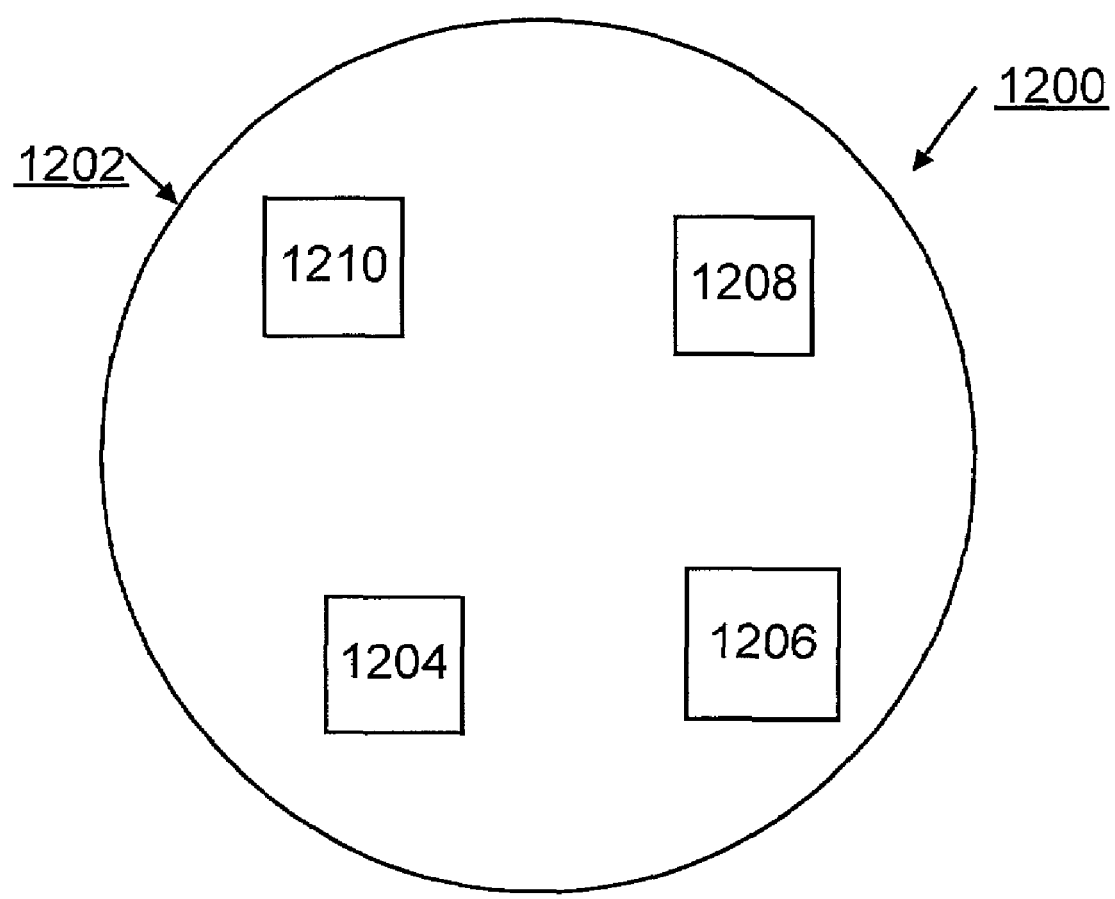
FIG. 12 is a block diagram illustrating a computer program product in accordance with the preferred embodiment.

Referring now to FIG. 12, an article of manufacture or a computer program product 1200 of the invention is illustrated. The computer program product 1200 includes a recording medium 1202, such as, a floppy disk, a high capacity read only memory in the form of an optically read compact disk or CD-ROM, a tape, a transmission type media such as a digital or analog communications link, or a similar computer program product. Recording medium 1202 stores program means 1204, 1206, 1208, 1210 on the medium 1202 for carrying out the meeting insertion and rescheduling methods of the preferred embodiment in the system 100 of FIGS. 1A and 1B.

A sequence of program instructions or a logical assembly of one or more interrelated modules defined by the recorded program means 1204, 1206, 1208, 1210, direct the computer system 100 for carrying out the meeting insertion and rescheduling methods of the preferred embodiment.

It should be understood that while the present invention has been described with better scores being lower scores, the present invention is not limited to lower scores being better. It should be understood that the present invention easily can be implemented with better scores being higher scores.

While the present invention has been described with reference to the details of the embodiments of the invention shown in the drawings, these details are not intended to limit the scope of the invention as claimed in the appended claims.

What is claimed is:

1. A meeting scheduler, running on a computer, for automated meeting insertion rescheduling for busy calendars comprising:
   an electronic calendar meeting scheduling program storing meeting automation properties defined for each scheduled meeting; and
   said electronic calendar meeting scheduling program utilizing said stored meeting automation properties to calculate a conflict score, said conflict score used to identify a solution time block for the automated meeting rescheduling;
   said calculated conflict score includes a calculated move score for each meeting altered for automated meeting rescheduling;
   said calculated move score comprises: an increased move score based upon each time meeting has been moved, an increased move score based upon each day delay for alternate meeting time block, a decreased move score based upon each attendee with same conflict, and a decreased move score based upon each day for alternate meeting time block from a current date;
   wherein the calculated conflict score results in a minimum total score utilizing the move scores; and
   storing said identified solution time block for the automated meeting rescheduling.

2. A meeting scheduler for automated meeting rescheduling for busy calendars as recited in claim 1 wherein said electronic calendar meeting scheduling program stores meeting attendee automation properties defined for each attendee of each said scheduled meeting; and wherein said electronic calendar meeting scheduling program utilizes said stored meeting automation properties and said stored meeting attendee automation properties to identify said solution time block for automated meeting rescheduling.

3. A meeting scheduler for automated meeting rescheduling for busy calendars as recited in claim 1 wherein said electronic calendar meeting scheduling program identifies an unavailability event; and for each conflicting meeting for said identified unavailability event, decommits from each said conflicting meeting.

4. A meeting scheduler for automated meeting rescheduling for busy calendars as recited in claim 1 wherein said calculated move score includes a maximum value based upon an alternate meeting time block beyond a meeting deadline value.

5. A computer executed software program meeting scheduler for automated meeting rescheduling for busy calendars comprising:
   an electronic calendar meeting scheduling program storing meeting automation properties and meeting attendee automation properties defined for each scheduled meeting;
   said stored meeting automation properties including a move premium value, a shorten premium value, a leave premium value, and a plurality of approval options for moving, shortening and for allowing attendees to leave early;
   said meeting attendee automation properties including an attendee role, an attendee commitment option for attending; an attendee selected notification option, and a plurality of approval options for moving, shortening and for allowing attendees to leave early;
   said electronic calendar meeting scheduling program utilizing said stored meeting and attendee automation properties to identify a solution time block for the automated meeting rescheduling;
   said electronic calendar meeting scheduling program utilizing said stored meeting automation and attendee properties to calculate a conflict score and action list for each potential time block for the automated meeting rescheduling; wherein said conflict score is calculated using the smallest increment associated with said meeting automation properties and said meeting attendee automation properties to result in a minimum calculated conflict score; and
   said electronic calendar meeting scheduling program utilizing said calculated conflict score and action list to identify said solution time block for the automated meeting rescheduling; and
   said electronic calendar meeting scheduling program storing said identified solution time block for the automated meeting rescheduling.

6. A meeting scheduler for automated meeting rescheduling for busy calendars as recited in claim 5 wherein said calculated conflict score includes a calculated move score for each meeting altered for automated meeting rescheduling.

7. A meeting scheduler for automated meeting rescheduling for busy calendars as recited in claim 6 wherein said calculated move score includes at least one of an increased move score based upon each optional meeting attendee, an increased move score based upon each required meeting attendee, and an increased move score based upon each required approval by a meeting attendee.

8. A meeting scheduler for automated meeting rescheduling for busy calendars as recited in claim 5 wherein said calculated conflict score includes a calculated leave early score for each meeting altered for automated meeting rescheduling.

9. A meeting scheduler for automated meeting rescheduling for busy calendars as recited in claim 8 wherein said calculated leave early score includes at least one of a stored leave early premium meeting automation property value, an increased leave early score based upon number of minutes for leaving early, and an increased leave early score based upon each required approval by a meeting attendee.

10. A meeting scheduler for automated meeting rescheduling for busy calendars as recited in claim 8 wherein said calculated leave early score includes an increased leave early score based upon each leaving participant's meeting role.

11. A meeting scheduler for automated meeting rescheduling for busy calendars as recited in claim 5 includes a calculated shorten meeting score including at least one of a stored shorten meeting range premium meeting automation property value, an increased shorten meeting score based upon number of minutes to shorten meeting, and an increased shorten meeting score based upon each required approval by a meeting attendee.

12. A meeting scheduler for automated meeting rescheduling for busy calendars as recited in claim 5 includes a calculated shorten meeting score including at least one of a decreased shorten meeting score based upon each day for alternate meeting time block from a current date, and a decreased shorten meeting score based upon previous or next periodic meeting not being shortened and a decreased shorten meeting score based upon each day for an alternate meeting time block from next periodic meeting.

13. A meeting scheduler for automated meeting rescheduling for busy calendars as recited in claim 5 wherein said calculated conflict score includes for each meeting altered for automated meeting rescheduling at least one of a calculated move score, a calculated leave early score and a calculated shorten meeting score.

14. A meeting scheduler for automated meeting rescheduling for busy calendars as recited in claim 13 wherein a lowest one of said at least one of said calculated move score, said calculated leave early score, and said calculated shorten meeting score is added to said conflict score.

15. A meeting scheduler for automated meeting rescheduling for busy calendars as recited in claim 13 wherein a lowest score action of said calculated move score, said calculated leave early score, and said calculated shorten meeting score is added to said action list.

16. A computer program product for automated meeting insertion and rescheduling for busy calendars, said computer program product including a plurality of computer executable instructions stored on a computer readable medium, wherein said instructions, when executed by a computer, cause the computer to perform the steps of:

storing meeting automation properties defined for each scheduled meeting; said stored meeting automation properties including a move premium value, a shorten premium value, a leave premium value, and a plurality of approval options for moving, shortening and for allowing attendees to leave early;

storing meeting attendee automation properties defined for each attendee of each said scheduled meeting; said meeting attendee automation properties including an attendee role, an attendee commitment option for attending; an attendee selected notification option, and a plurality of approval options for moving, shortening and for allowing attendees to leave early;

calculating a conflict score and action list for each potential time block for the automated meeting insertion and rescheduling utilizing said stored meeting automation properties and said stored meeting attendee automation properties; wherein said conflict score is calculated using the smallest increment associated with said meeting automation properties and said meeting attendee automation properties to result in a minimum calculated conflict score; said action list including an entry for each meeting altered for automated meeting insertion and rescheduling; and identifying a solution time block for the automated meeting insertion and rescheduling utilizing said calculated conflict score and action list of said potential time blocks; and storing said identified solution time block for the automated meeting rescheduling.

\* \* \* \* \*